US006201916B1

(12) United States Patent
Eggleton et al.

(10) Patent No.: US 6,201,916 B1
(45) Date of Patent: Mar. 13, 2001

(54) ARTICLE COMPRISING MEANS FOR OPTICAL PULSE RESHAPING

(75) Inventors: Benjamin John Eggleton, Summit; Gadi Lenz, Fanwood; Richart Elliott Slusher, Lebanon; Stefan Heinz Spalter, Bridgewater, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/268,285

(22) Filed: Mar. 15, 1999

(51) Int. Cl.[7] ................................................... G02B 6/293

(52) U.S. Cl. .............................. 385/122; 385/24; 385/37; 359/130

(58) Field of Search .................................. 385/10, 24, 37, 385/16; 359/326, 328, 161, 130, 333; 372/22, 20

(56) References Cited

U.S. PATENT DOCUMENTS

| 5,036,220 | | 7/1991 | Byer et al. ............................ 307/427 |
| 5,442,476 | * | 8/1995 | Yamazaki et al. .................... 359/173 |
| 5,815,307 | * | 9/1998 | Arbore et al. ........................ 359/328 |
| 5,867,304 | * | 2/1999 | Galvanauskas et al. ............. 359/333 |
| 5,987,200 | * | 11/1999 | Fleming et al. ....................... 385/37 |
| 6,028,693 | * | 2/2000 | Fork et al. ............................ 359/248 |
| 6,049,642 | * | 4/2000 | Nakamura et al. .................... 385/16 |

OTHER PUBLICATIONS

N. J. Smith et al., "Optical Society of America", Picosecond Soliton Transmission Using Concatenated Nonlinear Optical Loop–Mirror intensity Filters, vol. 12, No. 6, pp. 1117–1125, Jun. 1995.*

Asobe et al., "Electronics Letters", *Efficient and Ultrafast All–Optical Switching Using High $\Delta n$, Small Core Chalcogenide Glass Fibre*, vol. 29, No. 22, pp. 1966–1967, Oct. 28, 1993.

Nakazawa et al., "Electronics Letters", *Experimental Demonstration of Soliton Data Transmission Over Unlimited Distances With Soliton Control in Time and Frequency Domains*, vol. 29, No. 9, pp. 729–730, Apr. 29, 1993.

Lucek et al., "Optic Letters", *All–Optical Signal Regenerator*, vol. 18, No. 15, pp. 1226–1228, Aug. 1, 1993.

Bigo et al., "IEEE Journal of Selected Topics in Quantum Electronics", *All–Optical Fiber Signal Processing and Regeneration for Soliton Communications*, vol. 3, No. 5, pp. 1208–1223, Oct., 1997.

Eggleton et al., "Optics Letters", *All–Optical Switching in Long–Period Fiber Gratings*, vol. 22, No. 12, pp. 883–884, Jun. 15, 1997.

Eggleton et al., "Physical Review Letters", *Bragg Grating Solitons*, vol. 76, No. 10, pp. 1627–1630, Mar. 4, 1996.

Mollenauer et al., "Optical Fiber Telecommunications", *Solitons in High Bit–Rate, Long–Distance Transmission*, vol. IIIA, Chapter 12, pp. 373–460, 1997.

(List continued on next page.)

Primary Examiner—John D. Lee
Assistant Examiner—Jennifer Doan
(74) Attorney, Agent, or Firm—Eugen E. Pacher (57) ABSTRACT

In an optical fiber communication system a pulse reshaper can transform a distorted input light pulse into a reshaped output light pulse. The disclosed pulse reshaper is an all-optical pulse reshaper that comprises an optical waveguide having an effective length, the waveguide connecting the input and the output and comprising optical non-linear material, with a periodic variation of an effective refractive index of the optical waveguide. The optically non-linear material and the periodic variation are selected such that the reshaped output light pulse is a substantially transform-limited output light pulse.

17 Claims, 3 Drawing Sheets

OTHER PUBLICATIONS

R. Taylor, "Cambridge University Press", *Optical Solitons–Theory and Experiment*, pp. 30–37 and 80–81, 1992.

G.P. Agrawal, "Academic Press", *Nonlinear Fiber Optics*, pp. 42–43 and 144–147, 1995.

H. Takahashi, "Electronics Letters", *Arrayed–Waveguide Grating For Wavelength Division Multi/Demultiplexer With Nanometre Resolution*, vol. 26, No. 2, pp. 87–88, Jan. 18, 1990.

Ouellette et al., "Electronics Letters", *Bradband and WDM Dispersion Compensating Using Chirped Sampled Fibre Bragg Gratings*, vol. 31, No. 11, pp. 899–901, May 25, 1995.

Myers et al., "Optical Society of America",*Quasi–Phase–Matched Optical Parametric Oscillators in Bulk Periodically Poled $LINbO_3$*, vol. 12, No. 11, pp. 2102–2116, Nov. 11, 1995.

Arbore et al., "Optics Letters", *Singly Resonant Optical Parametric Oscillation in Periodically Poled Lithium Niobate Waveguides*, vol. 22, No. 3, pp. 151–153, Feb. 1, 1997.

Kim et al., "Optics Letters", *Second–Order Cascading as the Origin of Large Third–Order Effects in Organic Single–Crystal–Core Fibers*, vol. 19, No. 12, pp. 868–870, Jun. 15, 1994.

Friberg et al., "IEEE Journal of Quantum Electronics", *Nonlinear Optical Glasses for Ultrafast Optical Switches*, vol. QE–23, No. 12, pp. 2089–2094, Dec. 12, 1987.

Asobe et al., "IEEE Journal of Quantum Electronics",*Application of Highly Nonlinear Chalcogenide Glass Fibers in Ultrafast All–Optical Switches*, vol. 29, No. 8, pp. 2325–2333, Aug. 8, 1993.

Stegeman et al., "Optics Letters", *Large Nonlinear Phase Shifts in Second–Order Nonlinear–Optical Porcesses*, vol. 18, No. 1, pp. 13–15, Jan. 1, 1993.

Stegeman et al., "Optical and Quantum Electronics", $\lambda^{(2)}$ *Casading Phenomena and Their Applications to All–Optical Signal Processing, Mode–Locking, Pulse compression and Solitons*, vol. 28, pp. 1691–1740, 1996.

Doran et al., "Optics Letters", *Nonlinear–Optical Loop Mirror*, vol. 13, No. 1, pp. 56–58, Jan. 1998.

Smith et al., "Optical Society of America", *Picosecond Soliton Transmission Using Concatenated Nonlinear Optical Loop–Mirror intensity Filters*, vol. 12, No. 6, pp. 1117–1125, Jun. 1995.

Wong et al., "Optics Letters", *Self–Switching of Opticsl Pulses in Dispersion–Imbalanced Nonlinear Loop Mirrors*, vol. 22, No. 15, pp. 1150–1152, Aug. 1, 1997.

Marquez et al., "Journal of Non–Crystalline Solids", *On the Influence of Ag–Photodoping on the Optical Properties of As–S Glass Films*, pp. 1223–1226, 1993.

Eggleton, B. J. et al., "Distributed Feedback Pulse Generator Based on Nonlinear Fibre Grating", *Electronics Letters*, vol. 32, No. pp. 2341–2342 (1996).

Eggleton, B.J. et al., "Commpression of Optical Pulses Spectrally Broadened by Self–Phase Modulation with a Fiber Bragg Grating in Transmission", *Applied Optics*, vol 37, No. 30, pp. 7055–7061 (1998).

Lazaridis, P. et al., "Time–Bandwidth Product of Chirped $Sech^2$Pulses: Application to Phase–Amplitude–Coupling Factor Measurement" *Optics Letters*, vol. 20, No. 10, pp. 1160–1162 (1995).

Lazaridis, P. et al., "Low effective phase–amplitude coupling factor for DFB and DBR lasers using complex coupling", *Cleo Conference* (1995).

\* cited by examiner

ARTICLE COMPRISING MEANS FOR OPTICAL PULSE RESHAPING

FIELD OF THE INVENTION

This invention pertains to articles (e.g., an optical fiber communication system) that comprise means for optical pulse reshaping.

BACKGROUND OF THE INVENTION

Early optical fiber communication systems typically used opto-electronic pulse regenerators, referred to as "repeaters". Regeneration involved detection of an incoming optical pulse, amplification, re-shaping and re-timing of the resulting detector output, and generation of the outgoing optical pulse. This approach was relatively expensive but otherwise satisfactory as long as the communication systems had relatively low bit rates. However, the above-referred to optoelectronic re-generation provides a bottleneck that has to be overcome before very high speed (e.g., data rates above about 40 Gb/s per channel) systems could be installed.

The development of optical fiber amplifiers was an important step towards elimination of the opto-electronic bottleneck. However, such amplifiers do not provide pulse shaping and re-timing.

All-optical processing is the key to overcoming the optoelectronic bottlenecks in high-speed communications networks. In particular, as the technology heads towards bit rates of 100 Gbits/s per channel in transparent communication systems, all-optical pulse regeneration is widely recognized as an important replacement for conventional electronic repeater technology.

Beside optical limiting and clock recovery, pulse re-shaping is one of the main concerns of optical pulse regeneration.

During propagation of an optical pulse from transmitter to receiver of an optical fiber communication systems, fiber-intrinsic properties such as dispersion and non-linearities are responsible for pulse distortion both in the temporal and the spectral domain. As a consequence, the bit error rate of the system is significantly increased in both time division multiplexed (TDM) and wavelength division multiplexed (WDM) systems. Thus, it would be desirable to have available all-optical means for pulse reshaping. Desirably, such means would be compact, adjustable, wavelength selective and cost effective, and would be applicable to any dispersive, nonlinear optical fiber communication system. This application discloses such means, and communication systems that comprise such means. M. Nakazawa et al., *Electronics Letters*, Vol. 29 (9), p.729, April 1993, disclose a soliton transmission system wherein the transmission fiber is soliton transmission fiber with average negative group velocity dispersion of −0.4 ps/km/nm. The system is selected to maintain the pulses as soliton pulses throughout, with the soliton peak power of a fundamental (N=1) soliton being as low as 0.65 mW, and the average soliton period being as long as 935 km. J. K. Lucek et al., *Optical Letters*, Vol. 18 (15), p. 1226, August 1993, disclose an all-optical signal regenerator comprising a nonlinear fiber loop mirror. S. Bigo et al., *IEEE J. of Selected Topics in Quantum Electronics*, Vol. 3 (5), p. 1208, October 1997 disclose soliton regeneration by means that comprise a nonlinear optical loop mirror. B. J. Eggleton et al., *Optics Letters*, Vol. 22(12), p. 883, June 1997, disclose all-optical switching and pulse reshaping in long-period fiber gratings that couple light between co-propagating core and cladding modes. B. J. Eggleton et al., *Physical Review Letters* Vol. 76 (10), p. 1627, March 1996, disclose the observation of nonlinear propagation effects in fiber Bragg gratings, resulting in nonlinear optical pulse compression and soliton propagation. They also disclose soliton formation in periodic structures.

For background on optical solitons see, for instance, "Optical Fiber Telecommunications", Vol. III A, Chapter 12, pp. 373–460, L. F. Mollenauer et al.; "Optical Solitons-Theory and Experiment", R. Taylor, editor, Cambridge University Press, 1992, especially pp. 30–37 and 80–81; and "Nonlinear Fiber Optics," $2^{nd}$ edition, G. P. Agrawal, Academic Press, (1995), especially pp. 42–43 and 144–147.

All references cited herein are incorporated herein by reference.

GLOSSARY AND DEFINITIONS

A "soliton" pulse herein is a substantially transform limited optical pulse that represents a balance between the effects of non-linearity and quadratic dispersion in the transmission medium, e.g., an optical fiber. An ideal soliton corresponds to a solution of a non-linear wave equation, e.g., the nonlinear Schroedinger equation. For practical purposes it is not necessary that a pulse be fully transform-limited to be herein considered a soliton pulse, and substantially transform-limited pulses generally are acceptable in the practice of the invention.

An optical pulse herein is a "transform limited" pulse if the product of its spectral bandwidth and its temporal width are the minimum allowed by the Fourier time-frequency relations. An optical pulse herein is "substantially transform limited" if the product of its spectral and temporal widths is at most 10% larger than the minimum allowed by the Fourier time-frequency relations.

An optical pulse herein is an electromagnetic pulse of a wavelength usable for optical fiber communications, not limited to wavelengths in the visible portion of the spectrum.

A periodic optical structure is "apodized" if at least one end thereof is designed to minimize out-of-band reflection lobes in the spectrum, corresponding to impedance matching the periodic structure to the contiguous transmission medium.

A physical quantity P is a non-linear function of a physical quantity Q if the quantity P(Q) can be expressed in the form $P(Q)=\chi_0+\chi_1 Q+\chi_2 Q^2+\chi_3 Q^3 \ldots$, wherein at least one of susceptibilities $\chi_2, \chi_3, \ldots$ non-zero. Herein, Q typically is electric field and P typically is polarization, with $\chi_0, \chi_1, \ldots$ generally refereed to as susceptibilities.

A "nonlinear optical loop mirror" (NOLM) comprises an optical coupler and a nonlinear optical fiber connecting the two output ports of the coupler, and can provide intensity-dependent switching.

"Anomalous group velocity dispersion" herein corresponds to the condition $\beta_2<0$, with $\beta_2$ as defined below.

"Chalcogenide glass" refers to amorphous material comprising one or more column VI element (e.g., S, Se, Te), and typically also comprising one or more of Ge, As, Sb or Te. An exemplary chalcogenide glass has composition $As_2S_3$.

By "photonic bandgap" we mean herein a frequency band in which electromagnetic wave propagation is forbidden. In particular, only small transmission occurs within the frequency band, exemplarily about 20 dB less than out of the frequency band.

SUMMARY OF THE INVENTION

In optical fiber communication systems, linear pulse compression techniques can correct for linear pulse distortions as introduced by dispersion. However, nonlinear technologies are required to compensate for nonlinear distortions commonly encountered in optical pulse transmission.

The pulse reshaping means according to the invention comprise a nonlinear optical waveguide (optical fiber or planar) with optical properties that vary periodically along the longitudinal axis of the waveguide. In preferred embodiments the effective refractive index of the waveguide core varies periodically, forming a Bragg grating.

For ease of exposition, the nonlinear waveguide with periodically varying optical property (or properties) will henceforth be referred to as a "grating", regardless of the type of variation that is used.

Optical pulses of the appropriate wavelength and amplitude are launched into the grating and propagate therethrough, experiencing an effective group velocity dispersion which typically is anomalous and large, exemplarily many orders of magnitude larger than in conventional optical fibers.

More specifically, if the peak power of an incoming distorted pulse exceeds a threshold value (to be discussed below), the grating nonlinearity balances the dispersion, and the distorted pulse is transformed into a substantially transform-limited pulse. The incoming pulse typically is distorted by dispersion and nonlinearity of the upstream transmission path. The reshaped pulse typically is provided to downstream utilization means.

Embodiments of the invention combine high group velocity dispersion and high nonlinearity (typically Kerr nonlinearity) in a single or segmented compact reshaping device. The group velocity dispersion typically is many orders of magnitude larger than dispersion is in silica glass. This is achieved by means of the periodic effective index modulation along the pulse propagation axis of the reshaping device. As a result, the characteristic length required for solitons (generally referred to as the soliton period or length) is reduced by many orders of magnitude, as compared to conventional silica glass, making possible a compact and stable pulse reshaping device. Furthermore, the use of a highly nonlinear material (e.g., a chalcogenide glass, or $LiNbO_3$) in the presence of high group velocity dispersion keeps the minimum pulse peak energy required for soliton formation at moderate levels, because the minimum peak energy for soliton formation is proportional to the ratio of group velocity dispersion and nonlinearity.

Segmentation of the pulse reshaping device into two or more sections (e.g., one section with high nonlinearity and one or more sections with high group velocity dispersion) is possible, provided the segments are short compared to the soliton period. Furthermore, associated with a pulse reshaping device according to the invention can be one or more gain sections, exemplarily as a preamplifier, as one or more amplifiers disposed between segments of the pulse reshaping device, or in any other desired sequence.

In a broad aspect the invention is embodied in an article (e.g., an optical fiber communication system) with improved all-optical pulse reshaping.

More specifically, the invention is embodied in an article comprising an all optical pulse reshaper adapted for transforming a spectrally and temporally distorted optical pulse provided to said pulse reshaper into a substantially transform limited optical pulse.

Significantly, the pulse reshaper has an input, an output downstream of said input, and an optical waveguide signal transmissively connecting the input and the output. The optical waveguide comprises optically nonlinear material with a periodic variation of an effective refractive index. The optically nonlinear material and the periodic variation are selected such that, for spectrally and temporally distorted optical pulses of peak energy above a threshold energy, the spectrally and temporally distorted pulses are reshaped into the substantially transform limited optical pulses that are provided to utilization means (e.g., downstream-disposed optical fiber, or a receiver).

An article according to the invention typically comprises means for compensating the linear dispersion in a spectrally and temporally distorted pulse, and furthermore comprises means for compensating a nonlinear pulse distortion in said optical pulses. The means for compensating at least some of the linear dispersion can be conventional dispersion-compensating fiber or other known techniques, e.g., linear pulse compression. However, in general, both the linear and the non-linear pulse distortions are compensated in the same structure. These effects can in general be achieved in a device of length about a meter.

The discussion below will generally be in terms of a preferred embodiment, wherein the waveguide in the pulse reshaper provides compensation of the linear and nonlinear distortion.

This is for ease of exposition only, and those skilled in the art will recognize that the invention is not thus limited. The waveguide with the grating (as the term is used herein), as well as the entire pulse shaping device, will be referred to as the Bragg soliton pulse reshaper (BSPR).

The soliton energy $E_1(\tau)$ can be readily calculated for the case of an input pulse of unchirped sech shape, and the above-referenced to lower threshold energy is $E_1(\tau)/4$. In practice the input pulse typically does not have unchirped sech shape, and numerical simulation is used to determine the threshold energy.

BRIEF DESCRIPTION OF THE DRAWINGS

The figures are not necessarily to scale or in proportion. Like features in different figures generally are designated by the same numeral.

DETAILED DESCRIPTION OF THE INVENTION

Figure 1:
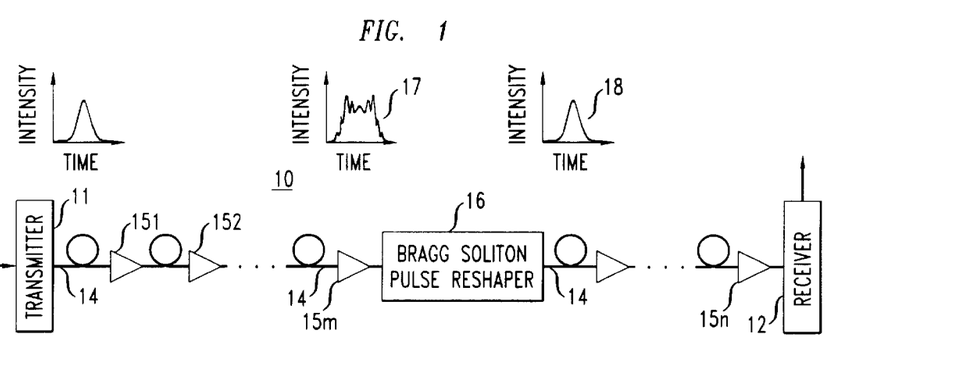
FIGS. 1 and 2 schematically show exemplary optical fiber transmission systems according to the invention.

FIG. 1 schematically depicts an exemplary optical fiber transmission system 10 according to the invention. The system comprises transmitter 11, receiver 12, and a transmission path signal-transmissively connecting transmitter and receiver. The transmission path typically comprises conventional optical transmission fiber 14, and optionally comprises one or more optical amplifiers (151, 152, . . . 15m, . . . 15n), typically optical fiber amplifiers, e.g., erbium doped fiber amplifiers selected to amplify optical signals in the 1.5 µm wavelength region, or any other appropriate wavelength region.

The system of FIG. 1 also comprises BSPR 16, which receives distorted pulse 17 and reshapes it to yield substantially transform limited pulse 18, which propagates towards the receiver. It will be understood that a BSPR could be disposed directly before the receiver.

The system of FIG. 1 exemplarily operates at a single wavelength. However, systems that have more than one operating wavelength (i.e., WDM Systems) are known, and BSPRs can advantageously be used in such systems. This is exemplified by FIG. 2, which schematically depicts a q-channel WDM system. The WDM signals from transmitter 11 propagate downstream to amplifier 15m and are demultiplexed by conventional demultiplexer 17 (e.g., an arrayed waveguide grating; see, for instance, H. Takahashi et al., *Electronics Letters,* Vol. 26, p. 87 (1990). The multiplexed channels are then provided to respective BSPRs 161–16q for reshaping, with each BSPR tuned to the appropriate wavelength. The reshaped pulses are then multiplexed by conventional multiplexer 18, and propagate downstream to utilization means.

Figure 2:
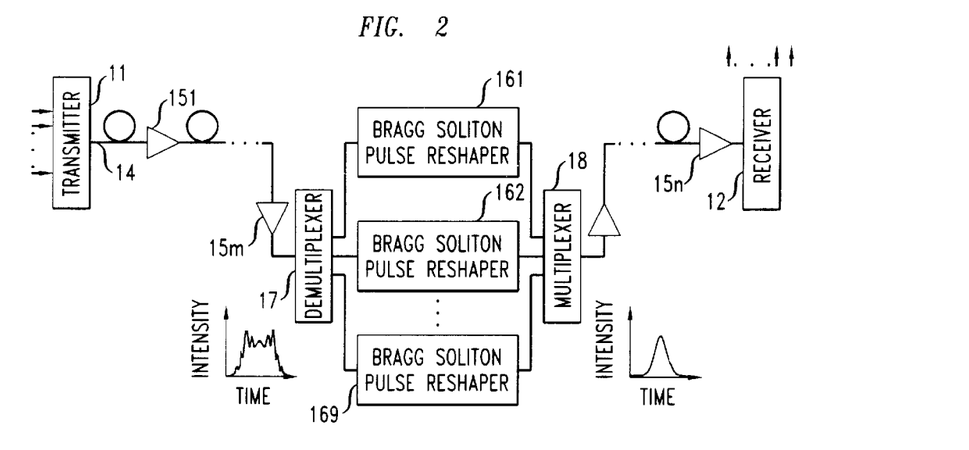

It will be understood that FIGS. 1 and 2 do not show conventional features such as connectors, isolators or WDM couplers. Furthermore, it will be understood that in WDM systems the BSPRs need not be arranged in parallel but could be arranged in series, that BSPRs can in principle be disposed at any desired position between transmitter and receiver, and that the number of BSPRs per channel will frequently be greater than one. Furthermore, a sampled grating (see, for instance, F. Ouellette et al., *Electronics Letters,* Vol. 31, p. 899 (1995)) could be used as a substitute for either a parallel-or series-connected multiplicity of BSPRs.

A BSPR according to the invention comprises a Bragg grating formed in a waveguide that exhibits substantial non-linearity with respect to the electric field of the pulses that propagate through the BSPR. The Bragg grating is selected such that the pulses experience an anomalous effective group velocity dispersion that is orders of magnitude (typically at least 100 times) larger (in absolute value) than the group velocity dispersion of conventional optical fiber. The BSPR furthermore is selected such that the waveguide non-linearity substantially balances the dispersion, whereby a given distorted pulse is transformed into a substantially transform limited pulse. Transmission of the pulses through the BSPR thus results in reshaping distorted optical pulses to be smooth and substantially transform limited even if dispersion and non-linearities during transmission from the transmitter to the BSPR have distorted the optical pulses to a form far from an ideal transform limited shape.

Figure 3:
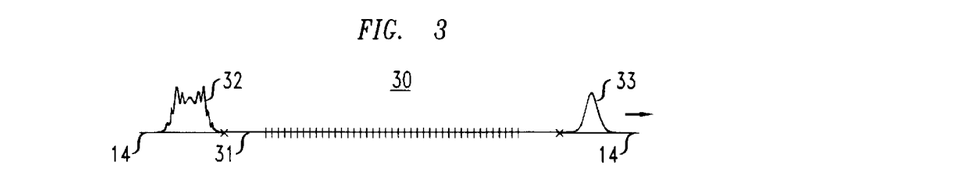
FIGS. 3 and 4 schematically depict relevant aspects of exemplary embodiments of the invention, the former showing a BSPR with high $\chi_3$ nonlinearity (exemplarily a chalcogenide glass fiber), and the latter showing a BSPR with cascaded high $\chi_2$ material (e.g., periodically poled $LiNbO_3$)

FIG. 3 schematically depicts an exemplary BSPR 30. Numeral 31 refers to an optical waveguide (typically optical fiber) having large Kerr non-linearity (corresponding to large $\chi_3$), typically at least 100 times larger than the non-linearity of vitreous silica. Exemplarily, the fiber comprises chalcogenide (e.g., $As_2S_3$), with an apodized Bragg grating formed in the fiber. The non-linear fiber is spliced to conventional (e.g., silica-based) transmission fiber 14. Numeral 32 refers to the distorted input pulse, and 33 refers to the substantially transform limited reshaped pulse. The Bragg grating is formed in the fiber core by conventional means, e.g., by selective exposure to actinic radiation, exemplarily red light. The Bragg grating is selected to have a photonic bandgap whose short wavelength band edge is close to (e.g., within 5%) the center wavelength of the pulses that are to be reshaped. As a result of this choice of band edge, the group velocity dispersion (GVD) experienced by the pulses upon propagation through the Bragg grating is anomalous, and can be many orders of magnitude (at least 100 times) greater than the GVD experienced in the silica-based optical fiber.

The bandgap of the Bragg grating can be readily tuned, exemplarily by straining the grating or by changing the temperature thereof. Typically, the bandgap is tuned such that the GVD of the pulse just balances the nonlinearity within the grating. This is a condition for formation of solitons.

Figure 4:
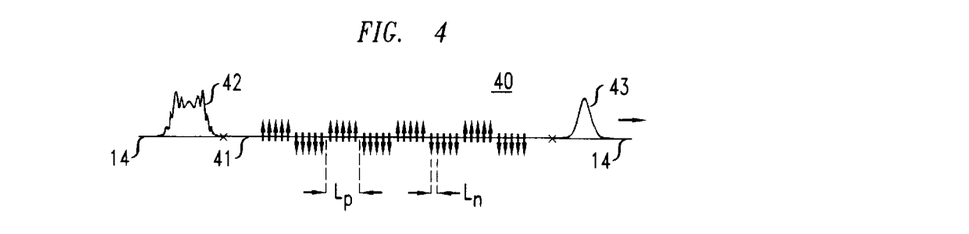

FIG. 4 schematically depicts another exemplary BSPR 40 according to the invention. Numeral 41 refers to a waveguide formed in cascaded high $\chi_2$ material, exemplarily $LiNbO_3$. The waveguide exemplarily is formed by proton exchange, as is conventional. The BSPR exhibits 2 periodicities, of period $L_p$ and $L_n$, respectively. The later is the period of a variation in the effective refractive index, and the former is a poling length selected to provide quasi phase matching. The variation in the effective refractive index exemplarily is due to the presence of a patterned layer (exemplarily silicon nitride) in the waveguide. $L_n$ is selected to provide an appropriate optical bandgap. The dispersion that is experienced by the pulses that are propagating along the waveguide is tuned, exemplarily by application of strain along the waveguide, or by changing the temperature thereof. The periodicity $L_p$ is formed by poling of the $LiNbO_3$, substantially as described by L. E. Myers et al., *J. Optical Soc. of America* B, Vol. 12(11), p. 2102 (1995); and M. A. Arbore et al., *Optics Letters,* Vol. 22(3), p. 151 (1997). See also, for instance, U.S. Pat. No. 5,036,220.

Both above discussed exemplary BSPRs are wavelength selective. Therefore, individual channels in a WDM system can be addressed by such BSPRs. By tuning the dispersion of the BSPR, the operation of the device can be adapted to different input pulse energy levels while the pulse width of the output pulse remains substantially constant. Alternatively, for a given pulse peak power and pulse width at the input of the BSPR, the pulse width at the output can be changed by changing the dispersion.

The invention can be embodied in substantially any optical fiber communication system that uses a "return-to-zero" transmission format, but of course can also be embodied in a separate component that is available for incorporation into an appropriate optical fiber communication system. The optical waveguide of a BSPR can be either an optical fiber or a planar optical waveguide.

Next we will give a brief summary of soliton characteristics, as determined analytically. These analytical results assume a sech input pulse. The results can serve as guides in the design and operation of a BSPR according to the invention. Analogous results for situations where the input pulse is not a sech pulse can be obtained in known manner by numerical simulation.

As is well know, both a lower and an upper limit on the energy of a soliton pulse are associated with the formation of a fundamental (N=1) soliton. Starting with a transform-limited hyperbolic secant (sech) shaped pulse with full width at half maximum (FWHM)τ, the lower and upper limits on the pulse energy are 25% and 225%, respectfully, of the energy $E_1(\tau)$ corresponding to the energy of a fundamental (N=1) soliton with pulse width τ. In terms of the group velocity dispersion $\beta_2$, the effective core area $A_{\it{eff}}$, the speed of light in vacuum c, the pulse center wavelength λ, the nonlinearity $n_2$, and the pulse width τ, $E_1(\tau)$ is given by $$E_1(\tau) = 1.763 \frac{\lambda A_{\it{eff}} |\beta_2|}{\pi n_2 \tau}.$$

See, for instance, the above referenced book by J. R. Taylor, especially p. 34 and FIG. 4.2. The latter inter alia shows the fraction of the total pulse energy contained in the fundamental soliton.

Assuming again an ideal, transform-limited sech shaped pulse with width τ at the input, for input energy $E_{in}(\tau) < E_1(\tau)$, the pulse width broadens during propagation through the BSPR, whereas for $E_{in}(\tau) > E_1(\tau)$, the pulse width narrows.

A length scale characteristic for soliton formulation is the so-called soliton length $z_0$ which is defined as $$z_0 = 0.322 \frac{\pi \tau_2}{2|\beta_2|}.$$

For the BSPR to operate as intended, $z_0$ should generally be equal to or smaller than the length L of the BSPR.

As will be recognized by those skilled in the art, pulses generally will not be transform-limited at the input of the BSPR, such that the above-recited energy limits serve as a guide only. If a pulse width τ is required at the output, at least the energy $E_1(\tau)$ has to be provided at the input for a soliton to be formed. Depending on the degree of distortion of the input pulse, this value has to be exceeded by more or less. For instance, in the case depicted in FIGS. 6 and 7, the input energy exceeds the soliton energy by a factor 1.25. The energy difference is coupled into the continuum.

It should also be noted that $E_1(\tau)$ depends on the dispersion, which is a free and adjustable parameter of a BSPR according to the invention. Thus, less energy is required to form a soliton of a given pulse width τ if the dispersion $|\beta_2|$ of the BSPR is reduced. However, the condition $z_0 < L$ limits the possible decrease of the dispersion.

Furthermore, it will be understood that the input energy can be adjusted by amplification of the signal pulses by means of an optical amplifier disposed upstream of the BSPR. In practice, the system performance will typically be optimized by selection of the amplifier gain and of the BSPR dispersion.

An ideal optical soliton has hyperbolic secant (sech) shape. Pulses of such shape also are the natural outputs of many pulsed lasers, e.g., Er-doped fiber lasers and mode-locked semiconductor lasers. In embodiments of the invention the input pulses into the transmission paths can be, but need not be, of sech shape, since non-sech pulses generally will be shaped into sech shape during transmission through a BSPR according to the invention.

The soliton energy can be at a relatively low value that is compatible with optical fiber communication systems if the waveguide of the BSPR has large non-linearity. Exemplarily, the waveguide comprises material with cascaded second order ($\chi_2$) nonlinearities (e.g., $LiNbO_3$) or highly non-linear third order ($\chi_3$) materials, e.g., chalcogenide glass. See, for instance, D. Y. Kim et al., *Optics Letters,* Vol. 19, page, 868 (1994); S. R. Friberg et al., *IEEE J. of Quantum Electronics,* Vol. 23, page 2089 (1987); and M. Asobe et al., *J. of Non-Crystalline Solids,* Vol. 164–166, page 1223 (1993).

By way of recapitulation, in FIG. 1 a pulse of approximately sech shape is shown next to transmitter 11, signifying the input pulses that are coupled into the fiber link. During propagation of the pulses in the downstream direction, the pulses experience distortions due to group velocity dispersion (a linear effect) and fiber non-linearities (e.g., Kerr non-linearity,). The former, acting alone, changes the temporal profile of the pulses, and the latter modify both the spectral and temporal profiles. In general, both the former and the latter are present in optical fiber. Acting together, they give rise to a complex temporal and spectral structure of the pulses, as schematically shown in the diagram, near amplifier 15m in FIG. 1. For instance, an originally transform limited pulse with constant phase in the spectral and temporal domain changes into a pulse with nonuniform and non-linear spectral and temporal phase. These distortions can not be compensated by linear dispersion compensation schemes such as prism pairs, diffraction gratings, or linear fiber Bragg gratings, but require a non-linear compensation scheme. The BSPR provides the required linear and non-linear distortion of the distorted pulses to transform the distorted pulses into substantially transform-limited pulses, as shown schematically in FIG. 1.

In a currently preferred embodiment the BSPR is a simple unitary device that comprises a highly dispersive periodic structure that provides both linear and non-linear reshaping. However, in a non-preferred alternative, a linear dispersion compensating device (e.g., dispersion compensating fiber) and a BSPR are disposed in the transmission link in series. Whereas the former partially restores the linear phase distortion of the pulses, the latter is selected to compensate for the non-linear distortions and remaining linear distortion.

Next we will describe two exemplary BSPRs, the first one using an optical fiber with chalcogenide glass core and cladding, and the second one using a planar waveguide formed in periodically poled $LiNbO_3$.

EXAMPLE 1

Figure 5:
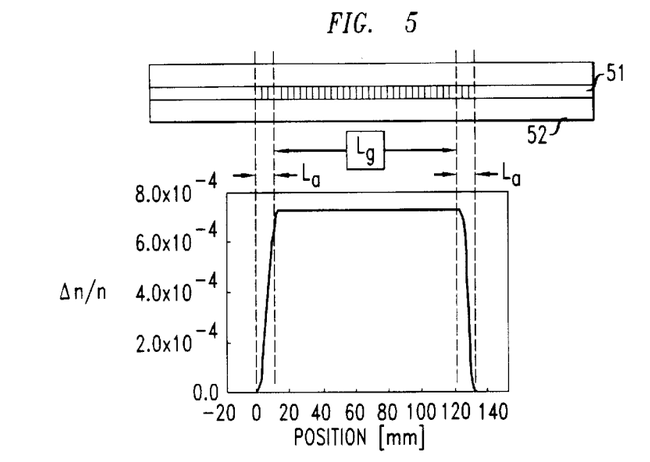
FIG. 5 schematically shows an exemplary BSPR and its normalized peak refractive index as a function of position.

A length of optical fiber with $As_2S_3$-based core and cladding is provided. Exemplarily, the core composition is $As_{38}S_{62}$ and the cladding composition is $As_{36.8}S_{63.2}$. An apodized Bragg grating is formed in the fiber by conventional exposure to red light. The length $L_g$ of the grating with uniform refractive index modulation is 110 cm, and the length $L_a$ of each apodization section is 11 cm. The refractive index modulation period $L_n$ is 324 nm, selected such that the first order (m=1) Bragg condition $$L_n = \lambda_B/2n$$

is met for a Bragg wavelength $\lambda_B = 1.55$ μm and a core refractive index n=2.39. FIG. 5 schematically shows the optical fiber and the envelope of the refractive index profile, where 51 and 52 refer, respectively, to the fiber core and cladding, and Δn/n is the normalized refractive index variation. Indicated are also $L_g$ and $L_a$. Associated with the Bragg grating is a group velocity dispersion $\beta_2$, where $$\beta_2 = -(n/c)^2 (1/\delta) (\kappa/\delta)^2 [1 - (\kappa/\delta)^2]^{3/2}.$$

In this expression, c is the speed of light, and $\kappa = \pi \Delta n m/\lambda_B$ is the coupling coefficient, with Δn the index modulation and π the fraction of the pulse energy in the core. The tuning parameter $$\delta = (n/c)(\omega - \omega_B),$$

where ω is the radial frequency and $\omega_B$ is the radial Bragg frequency. The wavelength detuning from the center of the photonic bandgap of the Bragg grating is given by $$\Delta\lambda = -(\lambda_B^2 \delta)/(2\pi n).$$

As can be seen from the above, the sign of the group velocity dispersion (GVD) depends on the side of the bandgap at which the device is operated. Typically, in BSPRs according to the invention, the frequency range above the photonic bandgap (corresponding to δ>κ) where GVD is negative (i.e., where $\beta_2<0$), is of interest. In principle, operation of a BSPR in the normal dispersion region ($\beta_2>0$) or even within the bandgap is possible but not preferred.

For detunings δ close to κ, third order dispersion $\beta_3$ may affect the performance of the BSPR, where $\beta_3$ is given by $$\beta_3 = 3\left(\frac{n}{c}\right)^3 \frac{1}{\delta^2} \frac{(\kappa/\delta)^2}{(1-(\kappa/\delta)^2)^{5/2}}.$$

As long as $\tau^3/\beta_3$ is much less than $\tau^2/\beta_2$, third order dispersion can be neglected for the BSPR operation.

In the above exemplary BSPR, the parameters are chosen such that the coupling constant $\kappa=17590$ m$^{-1}$, and the detuning $\delta=20620$ m$^{-1}$. This yields a GVD ($\beta_2$) of the grating of $-15.75\times10^6$ ps$^2$/km, which is greater than the GVD (at 1.55 μm) of a standard single mode communication fiber by a factor of about $10^6$.

For pulses as short as 100 ps, the corresponding soliton period is about 0.32 m, indicative of the fact that upon propagation of a distorted pulse through the Bragg grating, a substantially bandwidth limited pulse can result.

The above recited values of κ and δ yield a group velocity along the grating that is only 52% of the speed of light in grating-free chalcogenide. Simultaneously, for these parameters, the pulse energy is enhanced by a factor of 5 within the grating compared to outside the grating.

Taking the nonlinear refractive index $n_2$ (corresponding to $\chi^3$) of the chalcogenide fiber grating to be $2\times10^{-14}$ cm$^2$/W, with κ, δ and $\lambda_B$ having the above recited values, the minimum energy required outside the grating for a fundamental (N=1) soliton with width τ=100 ps is 43 pJ. For a pulse stream with a 25% duty cycle, this energy translates into an average power of 95 mW. Depending on the distortion of the input pulse this value has to be more or less exceeded. For the particular distorted input pulse as it is shown in FIG. 6 and 7, the input energy for a 100-ps soliton at the BSPR output is at 54 pJ which differs by a factor 1.25 from the corresponding fundamental soliton energy $E_1(\tau)=$ 43 pJ, for τ=100 ps.

The above example indicates that distorted pulses can be readily reshaped by means of a BSPR according to the invention.

Figure 6:
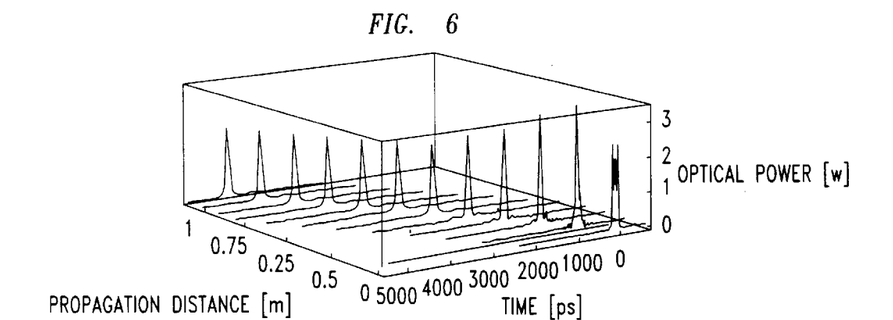
FIG. 6 shows pulse reshaping by pulse propagation through a BSPR, as determined by a computer simulation.

FIG. 6 shows the results of a numerical simulation of pulse propagation through the above-described BSPR. The simulation shows that the highly distorted input pulse becomes a substantially transform limited output pulse of substantially sech shape within the grating length.

Figure 7:
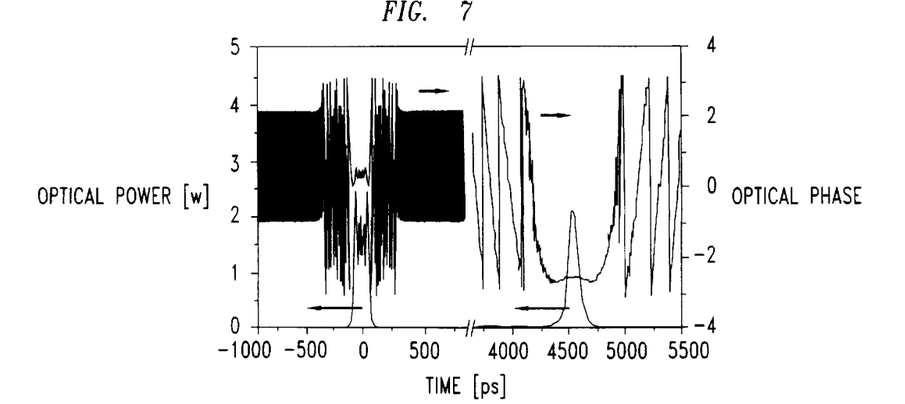
FIG. 7 shows optical power and optical phase, as a function of time, of an input pulse to a BSPR, and of the corresponding output pulse, as determined by a computer simulation.

FIG. 7 also shows the results of a numerical simulation of pulse reshaping in the above described BSPR. In particular, the figure shows optical power and phase of a greatly distorted input pulse and the power and phase of the reshaped output pulse. The simulation shows that the output pulse is substantially transform limited and substantially of sech shape.

EXAMPLE 2

Figure 8:
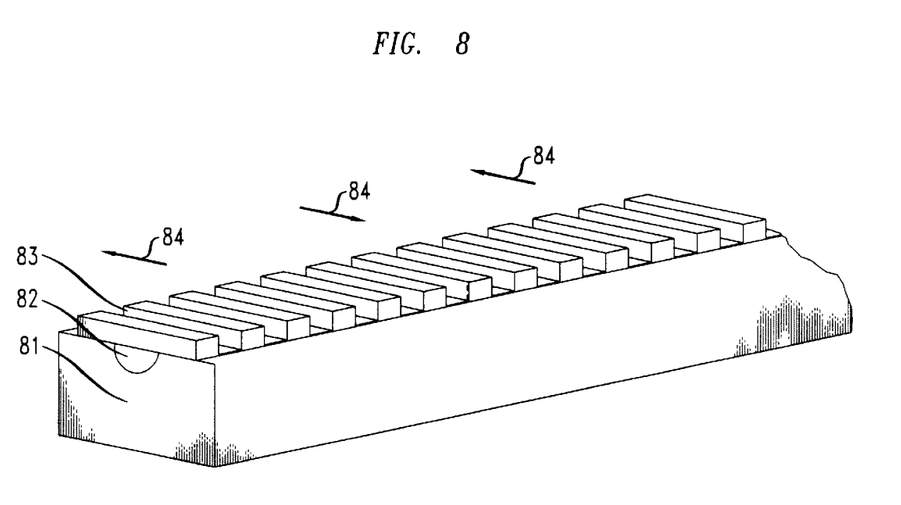
FIG. 8 schematically shows an exemplary BSPR with planar periodically poled waveguide.

The BSPR of this example comprises a periodically poled planar LiNbO$_3$ (or other material with large $\chi_2$ nonlinearity) waveguide with periodically varying effective refractive index. FIG. 8 schematically depicts such a waveguide, wherein numeral 81 refers to a LiNbO$_3$ body, numeral 82 refers to the proton-exchanged core of the waveguide, and numeral 83 refers to a patterned layer of an optically substantially linear material, e.g., silicon nitride, that provides a periodically varying effective refractive index. As indicated in FIG. 4, the poling period is $L_p$, and the grating period is $L_n$. Patterned linear layer 83 is formed by conventional means, e.g., by deposition, followed by photolithography and etching. In another embodiment, the patterned layer is replaced by a layer of chalcogenide, with the grating formed by exposure to actinic radiation.

Exemplarily, the waveguide has length 5 cm, with the proton exchanged core having width 2.5 μm and depth about 1 μm. The silicon nitride layer exemplarily is 0.25 μm thick, with the length of the retained and removed portions being equal.

The poling period $L_p$ exemplarily is selected to be 18.8 μm, whereby quasi phase matching is achieved in LiNbO$_3$, with a wave-vector mismatch ΔkL=10 π for a fundamental wave at $\lambda_F=1.554$ μm. The mismatch $\Delta k=(4\pi/\lambda_F)[n(\lambda_{SH})-n(\lambda_F)]-2\pi/L_P$, where $\lambda_{SH}$ is the second harmonic wavelength, and $n(\lambda_{SH})$ and $n(\lambda_F)$ are, respectively the core refractive indices at $\lambda_F$ and $\lambda_{SH}$.

The condition ΔkL=10π it substantially optimizes the effective nonlinear phase shift of the pulse, and allows a simplified description of soliton propagation in terms of an effective nonlinear Schroedinger equation. See, for instance, G. I. Stegman et al., *Optics Letters*, Vol. 18(1), p. 13 (1996) and G. I. Stegman et al., *Optical and Quantum Electronics*, Vol. 28, p. 1691 (1996). The corresponding effective nonlinear refractive index $n_2=2.3\times10^{-11}$ cm$^2$/W. The longitudinal index modulation period $L_n$ is determined by the Bragg condition. For LiNbO$_3$ with refractive index n=2.2 at $\lambda_F$, $L_n=353$ nm. The index modulation is achieved by provision of the patterned silicon nitride.

Techniques are known for manufacturing in LiNbO$_3$ a waveguide with periodically varying effective refractive index, with alternate poling of the LiNbO$_3$. See, for instance, L. E. Myers et al., *J. of the Optical Society of America B*, Vol. 12(11), November 1995, p. 2102, and M. A. Arbore et al., *Optics Letters*, Vol. 22(3), February 1, 1997, p. 151.

Selecting the structure such that the coupling constant $\kappa=536$ m$^{-1}$, and the detuning parameter $\delta=628$ m$^{-1}$, the minimum energy required at the BSPR input for 100-ps soliton formation is 0.83 pJ. For a pulse stream with a 25% duty cycle, this energy translates into an average power of 1.84 mW. As in example 1, depending on the distortion of the input pulse, this value has to be more or less exceeded.

Depending on the bitrate of an optical communication system according to the invention, the permissible bit error rate and the transmission length, it may be desirable to provide a spectral filter, a temporal filter, or both, to eliminate the part of pulses which is, at the output end of the BSPR, not contained in the soliton pulse, and hence is dispersed in the time domain. This non-soliton part of the pulse is frequently referenced to as "dispersive waves". Whereas an electro-optically controlled device might be used as a temporal filter up to about 100 GHz, for higher bit rates an all-optical temporal filter (advantageously based on a fast nonlinearity) is desirable. An example is a nonlinear optical loop mirror (NOLM). See, for instance, N. J. Doran et al., *Optics Letters*, Vol. 13, p. 56 (1988); N. J. Smith et al., *Journal of the Optical Society B*, Vol. 12, p. 1117 (1995), and W. S. Wong et al., *Optics Letters.*, Vol. 22, p. 1150 (1997).

Figure 9:
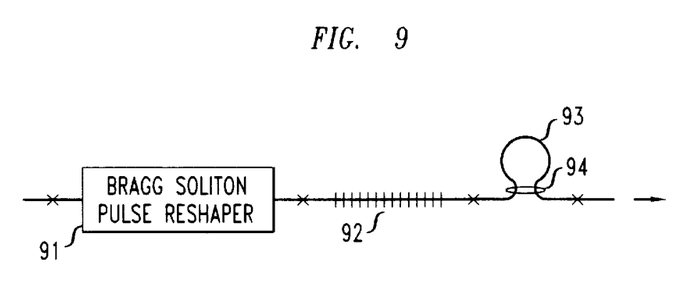
FIG. 9 schematically shows relevant aspects of a system according to the invention with a BSPR and nonlinear optical loop mirror.

FIG. 9 schematically shows the relevant portion of an optical fiber communication system according to the invention with a NOLM, with numerals 91–94 referring to a BSPR as discussed, a linear Bragg fiber grating, a nonlinear fiber loop, and an asymmetric coupler, respectively.

Briefly, in a NOLM the nonlinear switching is achieved by imbalancing the coupling ratio of the coupler, or by imbalancing the dispersion or the nonlinearity in the non-linear loop fiber. Furthermore, any combination of these techniques is also possible. With proper choice of the NOLM design parameters, the NOLM transmits the relatively high intensity soliton part of the pulses and rejects the dispersive waves. Typically, an optical isolator (not shown) is provided to avoid disturbance of the system by the back-reflected dispersive waves. Remaining side bands in the frequency domain optionally are eliminated by an appropriate spectral filter (not shown), exemplarily a band-pass fiber grating.

Similar to the above discussed BSPRs, a NOLM is based on the ultrafast Kerr nonlinearity and can function at very high frequencies, up to about $3 \times 10^{14}$ Hz.

It will be understood that the above described embodiments are exemplary only, and that various alternative embodiments are possible and are contemplated. For instance, a chalcogenide glass planar waveguide photonic bandgap structure is possible, as is a cascaded second order nonlinear fiber with a periodic refractive index modulation. Furthermore, a grating may be chirped to achieve some desired property, e.g., improved adiabatic soliton formation, the BSPR may be operated in the normal dispersion require (hence allowing for re-shaping of dark solitons; see the above cited book by Agrawal), or even inside the bandgap.

The invention claimed is:

1. An optical waveguide communication system comprising a transmitter, a receiver, and an optical waveguide transmission path that signal-transmissively connects said transmitter and receiver; said transmission path comprising a pulse re-shaper having an input and an output, the reshaper adapted for transforming a distorted input light pulse that arrives at the input from the transmitter into a reshaped output light pulse at said output, the reshaped output light pulse provided to utilization means, where associated with said input light pulse at the input is a first center wavelength, a pulse energy, and an effective pulse width;
CHARACTERIZED IN THAT
   a) the pulse-reshaper is an all-optical pulse re-shaper comprising an optical waveguide of effective length L that signal transmissively connects said input with said output, wherein said optical waveguide comprises optically non-linear material, with predetermined periodic variation of an effective refractive index of the optical waveguide; wherein
   b) said optically non-linear material and said predetermined periodic variation are selected such that
   i) associated with said re-shaped output light pulse is a center wavelength that is essentially the same as said first center wavelength; and
   ii) said-reshaped output pulse is a substantially transform-limited output light pulse.

2. Article according to claim 1, wherein said pulse energy associated with the input pulse is a pulse energy in a predetermined energy range that includes a soliton energy $E_1(\tau)$, where $\tau$ is a pulse width.

3. Article according to claim 2, wherein said soliton energy $$E_1(\tau) = 1.763 \frac{\lambda A_{\mathit{eff}} |\beta_2|}{\pi n_2 \tau},$$

where $\lambda$ is center wavelength of the pulse, $A_{\mathit{eff}}$ is effective core area, $\beta_2$ is the group velocity dispersion parameter and $n_2$ is the waveguide nonlinearity.

4. Article according to claim 2, wherein said pulse energy associated with the input light pulse is in the approximate range $0.25\, E_1(\tau)$ to $2.25\, E_1(\tau)$.

5. Article according to claim 3, wherein said effective length L of the optical waveguide is greater than or equal to a soliton length $Z_0$, where $Z_0 = 0.322\, \pi \tau^2 / (2|\beta_2|)$.

6. Article according to claim 1, wherein said optically non-linear material is selected from the group consisting of the chalcogenides and $LiNbO_3$.

7. Article according to claim 1, wherein the optically non-linear material is $LiNbO_3$, alternately poled to give quasi-phase-matching.

8. Article according to claim 1, wherein said optical waveguide is selected to provide a photonic bandgap.

9. Article according to claim 8, wherein said photonic bandgap has a short wavelength band edge that is within about 5% of a center wavelength of said input light pulse.

10. Article according to claim 8, wherein said article comprises tuning means adopted for tuning said photonic bandgap with respect to a center wavelength of said input light pulse.

11. Article according to claim 10, wherein said tuning means comprise means for heating at least a portion of said optical waveguide, or said tuning means comprise means for mechanically straining at least a portion of said optical waveguide.

12. Article according to claim 1, wherein said periodic variation of the effective refractive index of the waveguide is selected to provide a Bragg grating.

13. Article according to claim 12, wherein said Bragg grating is an apodized Bragg grating.

14. Article according to claim 1, wherein the article is an optical communication system comprising a transmitter, a receiver, and an optical waveguide transmission path signal transmissively connecting said transmitter and said receiver, wherein said optical waveguide transmission path comprises at least one said pulse reshaper.

15. Article according to claim 14, wherein said optical communication system further comprises at least one optical amplifier disposed in said optical waveguide transmission path upstream of said pulse reshaper.

16. Article according to claim 14, wherein said optical communication system further comprises a spectral filter or a temporal filter or a spectral filter and a temporal filter, said filter or filters disposed downstream of said pulse reshaper and selected for eliminating at least a part of dispersive waves that are present in the optical waveguide transmission path downstream of the output of the pulse reshaper.

17. Article according to claim 16, wherein said temporal filter is a nonlinear optical loop mirror.

* * * * *